Patented June 9, 1942

2,285,579

UNITED STATES PATENT OFFICE 2,285,579

EMULSIONS

Erich Gröner, Darmstadt, Germany, assignor to Röhm & Haas Company, Philadelphia, Pa.

No Drawing. Application February 28, 1939, Serial No. 258,962. In Germany March 3, 1938

3 Claims. (Cl. 252—311.5)

This invention relates to aqueous emulsions of paraffin suitable for use in waterproofing textile materials.

It is known that emulsions of paraffin can be prepared by dispersing the wax in water containing soap and glue as the protective colloids. In order to obtain good waterproofing it is necessary to use an aluminum salt in conjunction with the emulsion, such salt usually being added to the emulsion. This can be done by adding the aluminum salt to a concentrated emulsion or by adding it to the emulsion after dilution to the proper concentration for use in impregnating a fabric.

Good waterproofing is obtained by treating the fabrics with emulsions containing paraffin, glue, soap, and aluminum salt, but the emulsions themselves have several disadvantages. For example, such emulsions are not stable at temperatures above about 80° C. This means that they cannot be heated to the best impregnating temperature without at least a partial destruction of the emulsion. They also foam very badly while in use and this often leads to spotty fabrics.

It has now been found that stable emulsions which do not have the above mentioned defects can be prepared by dispersing the paraffin or other waterproofing material such as waxes or oils, in an aqueous solution of a soluble salt of a polymer of an ethylene carboxylic acid and then adding to the emulsion a solution of a heavy metal salt such as aluminum, calcium, magnesium, chromium, etc. The free polymeric acid can also be used when it is sufficiently soluble in water.

The polymeric acids which may be used in the preparation of the emulsions according to the present invention are for example acrylic, methacrylic and maleic acids. These may be polymerized alone or they may be mixed with other polymerizable materials which contain a

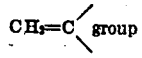

group and polymerized to joint polymers, a sufficient number of carboxyl groups being provided to render the polymer or salt thereof soluble in water. The water soluble salts are those of the alkali metals, ammonia and water soluble amines. The polymeric amides of the acids may also be employed provided they are soluble in water. These amides may also have lower alkyl substituents attached to the nitrogen atom. The polymeric carboxylic acids and joint polymers may be readily prepared by completely or partially saponifying a water soluble polymeric ester or other saponifiable polymer.

It is already known that water soluble polymeric carboxylic acids, their salts, derivatives, and joint polymers containing them may be used as dispersing or emulsifying agents for paraffin and the like. However, it has never before been known that emulsions prepared with these materials could be treated with salts of aluminum and other heavy metals without breaking the emulsion. In prior processes for waterproofing fabrics with such emulsions, the fabric was first impregnated with the emulsion and then treated with a solution containing the heavy metal salt which formed an insoluble salt of the polymeric acid directly on the fabric.

The invention may be illustrated, but is not limited, by the following example.

*Example.*—Ten parts of a 10% solution of sodium polyacrylate, 30 parts of water, 20 parts of a 20% soap solution, and 40 parts of paraffin are emulsified at 80° C. in a homogenising apparatus. 25 grams of this emulsion is then diluted to 1000 cc. and to this emulsion there is added 50 grams of a 6° Bé. solution of aluminum formate.

The final emulsion is employed to impregnate a fabric and yields an excellent waterproof material.

In place of the sodium polyacrylate the potassium or ammonium salt can be used. The corresponding salts of polymethacrylate acid and salts of mixed polymers such as one prepared from acrylic nitrile, acrylic amid and sodium acrylate may be employed. Part of the salt of the polycarboxylic acid may be replaced by glue or other usual dispersing agent.

I claim:

1. An aqueous emulsion stable at temperatures above 80° C. and adapted for waterproofing fabrics, which comprises paraffin emulsified in an aqueous solution comprising water, soap and a salt of a polymerized carboxylic acid selected from the group consisting of acrylic, methacrylic and maleic acids and a water-soluble salt of a heavy metal.

2. An aqueous emulsion stable at temperatures above 80° C. and adapted for waterproofing fabrics, which comprises paraffin emulsified in an aqueous solution comprising water, soap and sodium polyacrylate, and a water-soluble salt of a heavy metal.

3. An aqueous emulsion stable at temperatures above 80° C. and adapted for waterproofing fabrics, which comprises paraffin emulsified in an aqueous solution comprising water, soap and sodium polyacrylate, and a water-soluble salt of aluminum.

ERICH GRÖNER.